-50-75 XR 3,909,104

250/203

United States Patent [19]

Menke

[11] 3,909,104

[45] Sept. 30, 1975

[54] METHOD OF AND DEVICE FOR MODULATING THE CENTER POINT IN OPTICAL TRACKING DEVICES

[75] Inventor: Josef F. Menke, Glucksburg, Germany

[73] Assignee: Electro Optik GmbH & Co., Glucksburg, Germany

[22] Filed: Apr. 16, 1973

[21] Appl. No.: 351,787

[30] Foreign Application Priority Data

Apr. 15, 1972 Germany ........................... 2226372
Oct. 11, 1972 Germany ........................... 2250113

[52] U.S. Cl. .................... 350/6; 350/285; 250/203; 250/236

[51] Int. Cl.[2] ........................................ G02B 17/00

[58] Field of Search ........... 350/288, 286, 287, 294, 350/6, 7, 285, 299; 250/203, 236

[56] References Cited

UNITED STATES PATENTS

| | | | |
|---|---|---|---|
| 3,244,885 | 4/1966 | McHenry | 350/294 |
| 3,606,538 | 9/1971 | Hesse | 350/6 |
| 3,614,448 | 10/1971 | DiProse | 350/28 G |
| 3,622,232 | 11/1971 | Munnerlyn | 350/287 |
| 3,653,737 | 4/1972 | Stripling | 350/7 |
| 3,752,998 | 8/1973 | Stripling | 350/7 |

*Primary Examiner*—Alfred E. Smith
*Assistant Examiner*—Michael J. Tokar
*Attorney, Agent, or Firm*—Walter Becker

[57] ABSTRACT

A scanning method and device for optical tracking systems, according to which the image of the image field is turned by a reversion optical system and is deflected ahead of the last image plane.

12 Claims, 4 Drawing Figures

METHOD OF AND DEVICE FOR MODULATING THE CENTER POINT IN OPTICAL TRACKING DEVICES

Figures 1A, 1B, 1C, 2:
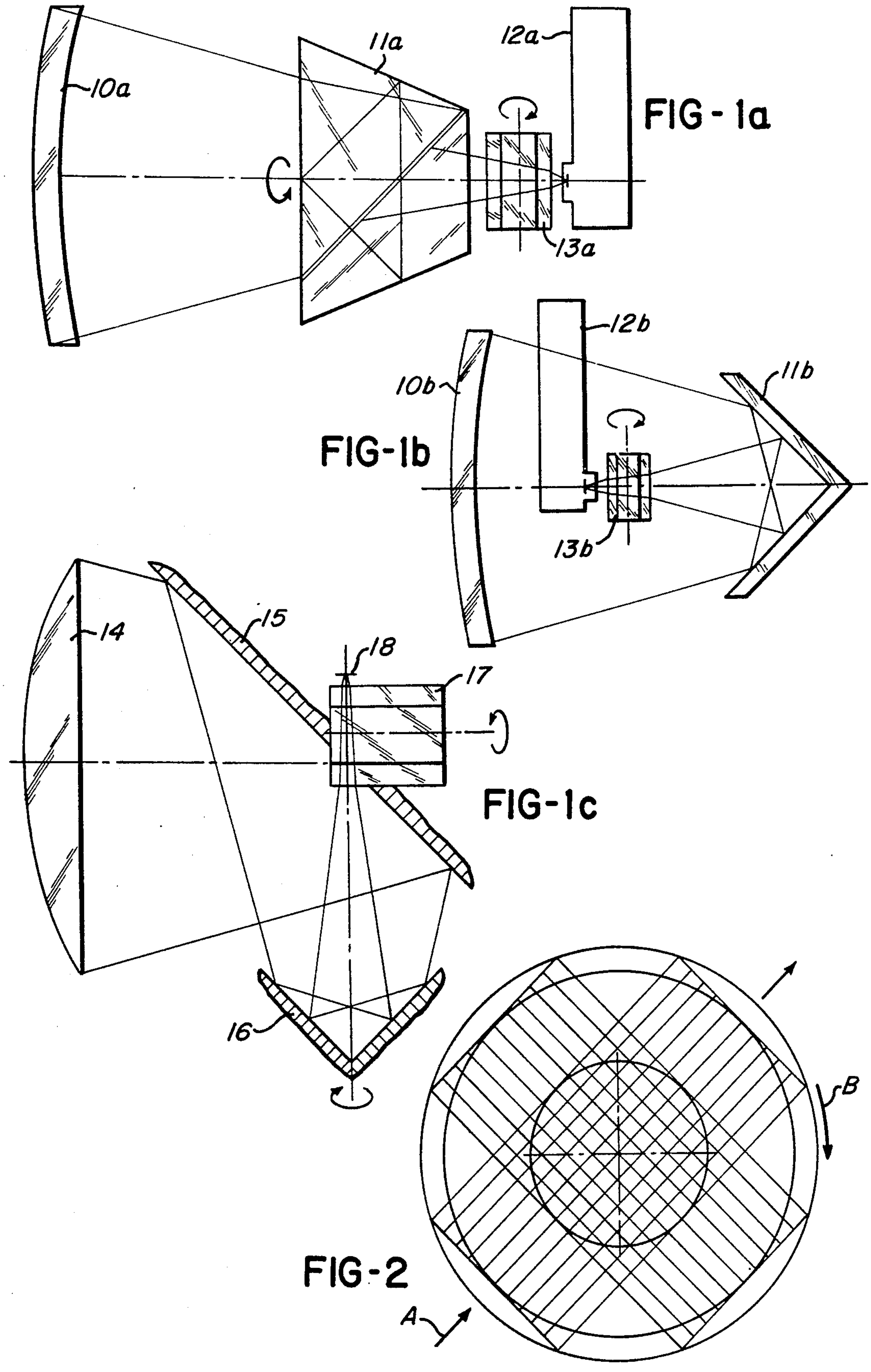

The present invention relates to a method and apparatus by means of which in polarly operating scanning or feeling systems the modulation is retained up to the center point of the picture field.

With tracking devices operating with central chopping discs, the arrow signal necessary for the follow up is generated directly in the optical sensor. Consequently, with successive follow up, when the target is located on the optical axis, the signal at the exit of the optical sensor tends to move toward zero. Such an arrangement has the drawback that the control deciding logic can only under difficulties decide between the situation "no target in the image field of the sensor" and "target in the optical axis". Also with sensors of the second generation which operate by means of a polar image field scanning by multi-element detectors, this problem remains.

Fundamentally, wherever the arrow signal for the control circuit of the follow up is generated in the sensor, the above described drawback is retained.

It is, therefore, an object of the present invention to provide a sensing method and apparatus for use in connection with optical tracking systems, which will overcome the above mentioned drawbacks.

It is another object of this invention to provide a scanning method and apparatus as set forth in the preceding paragraph, in which in case a target is obtained in the optical axis, a predetermined precisely predefined modulation frequency will be generated.

These and other objects and advantages of the invention will appear more clearly from the following specification, in connection with the accompanying drawings, in which:

FIG. 1*a* diagrammatically illustrates a scanning device for an optical tracking system according to the invention with a polygonal prism as scanning optics and a pentaprism as reversion optics.

FIG. 1*b* diagrammatically illustrates a scanning device according to the invention with a polygonal prism as scanning optics and a pentaprism mirror as reversion optics.

FIG. 1*c* shows the same device as illustrated in FIG. 1*b*, but with the interposition of a deviating or surface mirror provided with a breakthrough or opening.

FIG. 2 is a sketch showing the principle of the scanning device according to the invention when employing a multi-element detector.

The scanning method according to the invention is characterized primarily in that the modulation in the center of the image field is maintained by means of a reversion optics or optical system and a polygonal prism. In this way a signal will always be generated as soon as a target appears in the image field. The emission of an error signal will be carried out by a follow-up electronic system. More specifically, according to the invention, the image of the image field by a reversion optics is caused to rotate and then is ahead of the last image plane deviated in a cartesian manner. When employing various embodiments of reversion optics, the invention may be employed in a converging diverging, or parallel beam path. It is a matter of course that the method according to the invention is applicable in a wide spectral range from the visible to the remote infrared.

Referring to the drawings in detail, FIG. 1*a* shows a scanning device according to the present invention, which comprises an objective 10*a*, a reversion optical system 11*a*, a multi-detector 12a, and a polygonal prism 13*a* interposed between said reversion optical system 11*a* and the multi-detector 12*a*. It will be appreciated that with the arrangement of FIG. 1*a*, the collimating rays are bundled by the objective 10*a*. Thereupon, in the paths of the rays, the reversion optical system (in this instance, a Schmidt-Pechan prism) and the polygonal prism are passed by the rays. By means of the reversion optical system, a conventional polar image scanning is produced.

FIG. 1*b* shows a modified apparatus according to the invention employing the same elements as shown in FIG. 1*a*, but in a different arrangement. The elements corresponding to those of FIG. 1*a* are therefore designated with the same numerals as in FIG. 1*a*, but with the affix *b* instead of the *a*. More specifically, FIG. 1*b* illustrates an arrangement with folded path of rays or ray beam which is particularly suitable for a short structure. In this instance, the Schmidt-Pechan prism is replaced by a pentamirror.

In FIG. 1*c* the entrance objective is designated with the reference numeral 14. The parallel rays entering through the objective 14 pass as a converging bundle to a deviating mirror 15. The bundle of rays reflected by the mirror 15 passes to a pentamirror 16 which brings about the turning of the image. The mirror 16 reflects the bundle back to a polygon prism 17 on the edge of which the image plane 18 will be located.

FIG. 2 shows the principle of the scanning method according to the invention when employing a multi-element detector. The scanning movement is indicated by the arrow A and the rotary movement of the reversion optics is indicated by the arrow B.

As will be evident from the above, the advantages obtained according to the present invention consist primarily in that also for a target located on the optical axis of the sensor, a modulation will be obtained. The respective most favorable arrangement of the polygonal prism as well as the most favorable relationship between rotation frequency and the frequency of the linear scanning can for each system be easily ascertained by calculation.

It is, of course, to be understood that the present invention is, by no means, limited to the specific showing in the drawings, but also comprises any modifications within the scope of the appended claims.

What I claim is:

1. A scanning method for passively operative optical tracking systems, which includes in combination the steps of turning the image of the image field for uniform modulation effected only by rotating a reversion optical system, and deflecting said image in a Cartesian sensing manner ahead of the last image plane.

2. A scanning method in combination according to claim 1, which includes the step of reducing to a minimum the shading of the focal aperture by providing additional optical elements in the path of the light rays.

3. A scanning method for passively operative optical tracking systems, which includes in combination the step of maintaining the modulation in the center of the image field whereby increasing signal clarity occurs by rotating a reversion optical system and a rotating polygonal prism for scanning in a Cartesian sensing manner.

4. A device for scanning an optical tracking system passively operative, which includes in combination a scanning optical system for sensing in a Cartesian manner and a rotating reversion optical system increasing clarity and modulating uniformity.

5. A device in combination according to claim 4, in which said scanning optical system for sensing in a Cartesian manner is formed by a rotating polygonal prism.

6. A device in combination according to claim 4, in which the reversion optical system is formed by a pentaprism.

7. A device in combination according to claim 4, in which the reversion optical system is formed by a rotating pentamirror.

8. A device in combination according to claim 4, which includes a multielement detector.

9. A device in combination according to claim 4, which includes a deflecting mirror arranged within the path of the light beams directed thereby, said mirror being provided also with a passage for the aperture.

10. A cartesian scanning device for passively operative optical tracking systems, which includes in combination: an objective arranged at one end of said device, detector means arranged at the opposite end of said device, a rotating reversion optical system between said objective and said detector means, and a polygonal prism interposed between said reversion optical system and said detector means.

11. A sensing device for passively operative optical tracking systems increasing clarity and modulating uniformity, which includes in combination: an objective, a pentamirror forming a rotating reversion optical system, detector means interposed between said objective and said pentamirror, and a rotating polygonal prism forming a Cartesian scanning device interposed between said pentamirror and said detector means.

12. A sensing device for passively operative optical tracking systems increasing clarity and modulating uniformity, which includes in combination: an objective, a rotating polygonal prism forming a Cartesian scanning device, a deviating mirror located between said objective and said polygonal prism and adapted through said objective to receive a bundle of rays and to reflect the same, and a rotating pentamirror arranged to receive the rays reflected by said deviating mirror and to turn the image and to reflect the same to said polygonal prism.

* * * * *